UNITED STATES PATENT OFFICE.

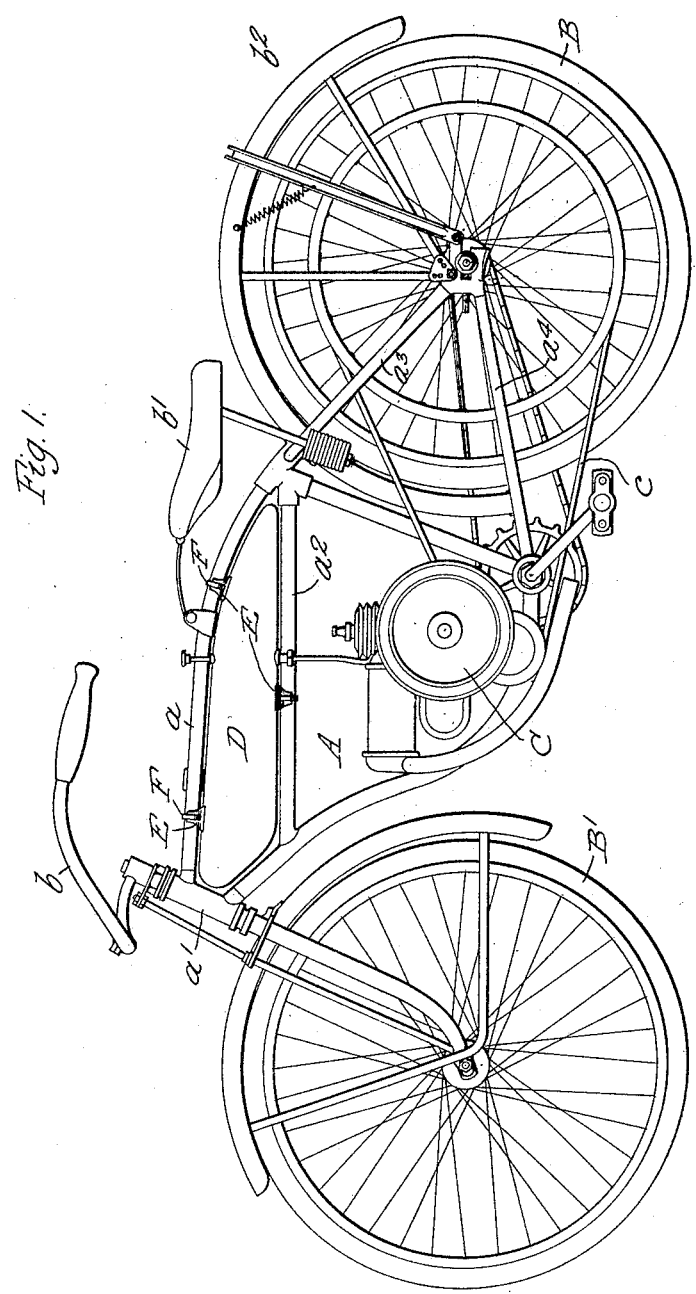

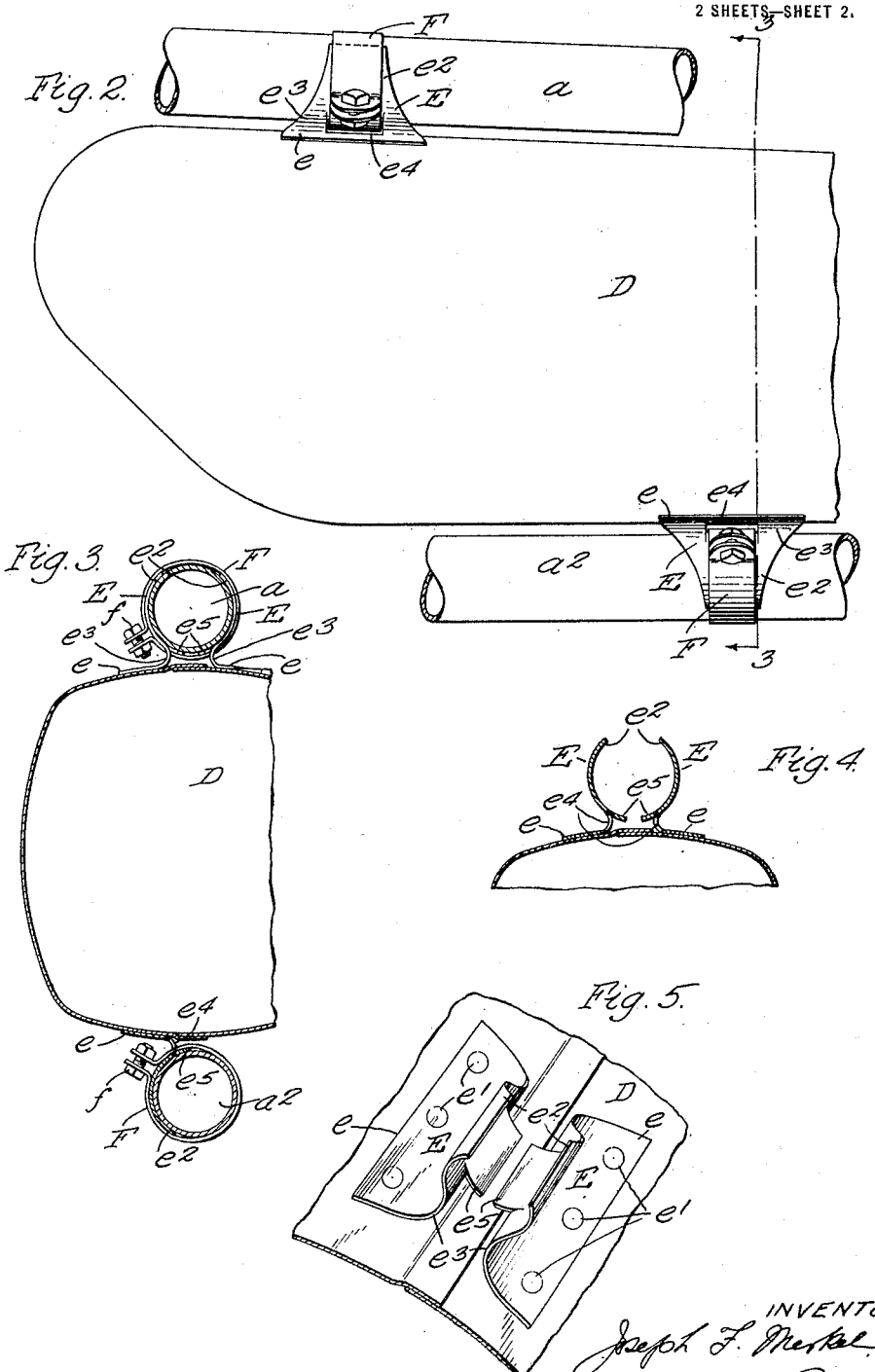

JOSEPH F. MERKEL, OF ROCHESTER, NEW YORK, ASSIGNOR TO CYCLEMOTOR CORPORATION, OF ROCHESTER, NEW YORK.

MEANS FOR SECURING ARTICLES TO MOTORCYCLES AND THE LIKE.

1,400,967.      Specification of Letters Patent.      Patented Dec. 20, 1921.

Application filed November 22, 1920. Serial No. 425,677.

*To all whom it may concern:*

Be it known that I, JOSEPH F. MERKEL, a citizen of the United States, residing at Rochester, in the county of Monroe and State of New York, have invented a new and useful Improvement in Means for Securing Articles to Motorcycles and the like, of which the following is a specification.

This invention relates to means for securing articles to the frames of bicycles, power cycles, and motor cycles or the like.

The objects of this invention are to provide a power or motor cycle with means of improved and simplified construction for securing an article, such as a fuel tank or the like to the frame of the machine.

In the accompanying drawings:

Figure 1 is a side elevation of a power or motor cycle provided with means embodying the invention for securing the fuel tank thereon.

Fig. 2 is a fragmentary side elevation thereof on an enlarged scale showing means for fastening the fuel tank to the motor cycle frame.

Fig. 3 is a transverse sectional elevation thereof on line 3—3, Fig. 2.

Fig. 4 is a fragmentary transverse sectional elevation showing the lugs or ears of the fastening devices.

Fig. 5 is a perspective view thereof also showing the lugs of the fastening devices.

The motor cycle is provided with the usual tubular frame A including an upper frame member $a$ which extends from a front frame member or steering column $a'$ rearwardly, an intermediate horizontal member $a^2$, and upper and lower rear fork members $a^3$ and $a^4$ between which the rear wheel B is arranged. B′ represents the front wheel, $b$ the handle bars, $b'$ the seat, and $b^2$ the mud guard for the rear wheel. The motor cycle may be driven by an engine C of any desired construction suitably connected, for example, by means of a belt $c$, with one of the wheels, the rear wheel in the construction shown acting as the driving wheel. The fuel for the engine is carried in a tank D which is suitably mounted on the frame of the motor cycle, preferably between the members $a$ and $a^2$ thereof. All of these parts have heretofore been used in connection with motor cycles and of themselves constitute no part of this invention.

In order to secure the fuel tank D on the frame of the motor cycle, fastening devices are provided which are preferably constructed as follows:—

The tank is provided with a plurality of lugs or ears E each of which comprises a base portion $e$ which is preferably welded to the fuel tank, for example by means of spot welding as shown at $e'$, Fig. 5. The base portions of the ears are formed integral with frame engaging parts $e^2$ which are preferably shaped to conform substantially to the exterior of the frame members of the motor cycle and are adapted to extend partly around the same. These frame engaging parts are connected to the base portions $e$ by means of connecting portions $e^3$ which are provided with openings or slots $e^4$, these slots being formed by cutting a part $e^5$ of the metal of the connecting portion and bending the same so that the cut away portion of the metal forms substantially a continuation of the frame engaging member $e^2$. These frame engaging ears may be arranged in pairs as shown in Figs. 4 and 5, or only one ear may be used as shown in the lower part of Fig. 3. In the construction shown, two fastening devices are shown which secure the upper portion of the tank to the frame member $a$. Each of these fastening devices includes two oppositely disposed ears E, and a single fastening device secures the lower portion of the tank to the frame member $a^2$, this fastening device including only a single ear E. In placing the fuel tank on the frame of the motor cycle, the tank is moved upwardly to place the upper fastening devices into engagement with the upper frame member $a$, and is then swung about the upper frame member to swing the lower ear E laterally into engagement with the lower frame member $a^2$.

In order to rigidly hold the frame engaging parts of the fastening devices on the frame members, straps F are preferably employed which are adapted to extend through the slots $e^4$ in the ears or lugs and around the frame engaging parts $e^2$ thereof and the corresponding frame member. The ends of this strap may be connected by any suitable means, such for example, as a bolt $f$. Consequently the frame engaging parts of the ears or lugs are securely held in engagement with the frame members of the motor cycle by the straps and do not subject the fuel tank to any strains or stresses other than those necessary to support the weight of the tank and its contents. The ears or lugs E are provided with enlarged base portions which make it possible to secure a rigid connection between the ears and the tank and which also permit the lugs to be provided with the slots $e^4$ without weakening the ears. The fastening devices are inexpensive to manufacture, being made entirely of sheet metal, and are thoroughly reliable in operation and do not in any way weaken the fuel tank or necessitate any perforation thereof.

I claim as my invention:—

1. The combination with the frame of a motor cycle and a fuel tank, of a fastening device for securing said tank to said frame, including a member secured to said tank and having a part extending into contact with said frame, said member having a slot adjacent to said frame, and a strap extending through said slot and around a frame member and around said part and securing said part to said frame.

2. The combination with the frame of a motor cycle and a fuel tank, of a fastening device for securing said tank to said frame, including an ear having a part secured to said tank, a part adapted to engage a frame member, and a neck portion connecting said two parts, said neck portion having a slot, and a strap extending through said slot and securing said frame engaging part to said frame.

3. The combination with the frame of a motor cycle and a fuel tank, of a fastening device for securing said tank to said frame, including an ear having a part secured to said tank, a part adapted to engage a frame member, and a neck portion connecting said two parts, said neck portion having a slot formed by partly severing a part of the said neck portion and bending said severed portion in a direction to engage said frame member, and a strap extending through said slot and pressing said frame engaging parts into contact with said frame member.

4. The combination with the frame of a motor cycle and a fuel tank, of a fastening device for securing said tank to said frame, including an ear having a part secured to said tank, a part shaped to conform to the periphery of an adjacent frame member, and a neck portion connecting said two parts, said neck portion having a slot formed by partly severing said neck portion and bending said severed portion to form substantially a continuation of said frame engaging part and holding said frame engaging part in contact with said frame member.

5. The combination with the frame of a motor cycle and a fuel tank, of a pair of oppositely disposed fastening devices secured on said tank and having parts bent to engage a frame member, said fastening devices being provided with slots, and a strap extending through said slots and engaging said bent parts and holding the same in engagement with said frame member.

6. The combination with the frame of a motor cycle and a fuel tank, of a fastening device for securing said tank to said frame, including a part welded to said tank and extending outwardly therefrom into a position to engage a frame member, said part having a slot, and a strap extending around said frame member and through said slot to securely hold said part in engagement with said frame member.

7. The combination with the frame of a motor cycle having upper and intermediate horizontal frame members, and a fuel tank arranged between said frame members, of a fastening device including ears secured to said tank and adapted to engage the opposite sides of one of said frame members, said ears having slots arranged adjacent to said tank, a strap extending through said slots and around said frame member and clamping parts of said ears to said frame member, and a fastening device comprising an ear secured to said tank and adapted to engage one side of the other of said frame members, and a strap extending around said other frame member and clamping a part of said ear to said other frame member whereby the tank may be placed between said frame members by placing said first mentioned fastening device into engagement with said first mentioned frame member and then swinging said tank about said frame member to move said last mentioned fastening device into engagement with said other frame member.

Witness my hand this 16th day of November, 1920.

JOSEPH F. MERKEL.

Witnesses:
L. R. EVANS,
A. C. RICE.